United States Patent [19]
Komatsu

[11] 3,991,865
[45] Nov. 16, 1976

[54] DEVICE FOR GRADUALLY INCREASING HYDRAULIC PRESSURE

[75] Inventor: Mitsuaki Komatsu, Kawasaki, Japan

[73] Assignee: Kabushiki Kaisha Komatsu Seisakusho, Tokyo, Japan

[22] Filed: Jan. 2, 1976

[21] Appl. No.: 645,932

Related U.S. Application Data

[63] Continuation of Ser. No. 446,826, Feb. 28, 1974, abandoned.

[52] U.S. Cl. .................. 192/109 F; 137/116.3; 91/447
[51] Int. Cl.² ............... F16D 25/12; F16K 31/12
[58] Field of Search ............ 192/109 F, 85 K; 91/433, 446, 447, 468; 137/116.3, 505.14, 505.15

[56] References Cited
UNITED STATES PATENTS

| | | | |
|---|---|---|---|
| 2,939,557 | 6/1960 | Dabich et al. | 192/85 R |
| 3,566,716 | 3/1971 | Chatterjea | 192/109 F |
| 3,583,422 | 6/1971 | Dach et al. | 137/116.3 |
| 3,625,322 | 12/1971 | Nagamatsu et al. | 192/85 R |
| 3,674,121 | 7/1972 | Copeland | 192/109 F |
| 3,687,152 | 8/1972 | Osaka | 137/115 |
| 3,709,065 | 1/1973 | Starling | 192/10 F |
| 3,722,646 | 3/1973 | Oguma | 192/109 F |

FOREIGN PATENTS OR APPLICATIONS

29,090  12/1972  Japan .................. 91/447

*Primary Examiner*—Benjamin W. Wyche
*Attorney, Agent, or Firm*—Armstrong, Nikaido & Wegner

[57] ABSTRACT

A device for gradually increasing hydraulic pressure in a hydraulic fluid supply control circuit for respective hydraulically operated cylinder-piston assemblies of clutches provided in a transmission, which has an inlet connected to a source of hydraulic pressure, an outlet connected to each of the cylinder-piston assemblies, a passage for communicating said inlet with said outlet, a quick return valve provided in said package and having a large diameter land portion and a plurality of small diameter land portions, means for gradually increasing hydraulic pressure including a cylindrical valve and a pressure regulating valve, wherein said pressure regulating valve is shut off from the main hydraulic circuit until the cylinder chamber of said clutch brake cylinder-piston assembly is filled with hydraulic fluid, whereby peak pressure is not produced immediately before the hydraulic pressure is started so as to permit the hydraulic pressure to be gradually increased.

14 Claims, 5 Drawing Figures

DEVICE FOR GRADUALLY INCREASING HYDRAULIC PRESSURE

This is a continuation of application Ser. No. 446,826 filed Feb. 28, 1974, now abandoned.

BACKGROUND OF THE INVENTION

This invention relates to a transmission, and more particularly to a device for gradually increasing hydraulic pressure in a hydraulic fluid supply control circuit of the transmission for shifting vehicle speed through the utilization of respective hydraulically operated cylinder piston assemblies of clutches provided in the transmission.

Conventional devices for gradually increasing hydraulic pressure have means for gradually increasing hydraulic pressure including a cylindrical valve, a pressure regulating valve, and a quick return valve for gradually increasing the hydraulic pressure within the main hydraulic circuit under the control of the pressure regulating valve together with the cylindrical valve. However, since fluid in the main hydraulic circuit is always communicated with the pressure regulating valve, if there exists fluid resistance within the main hydraulic circuit when lack of the cylinder chambers of the hydraulically operated cylinder-piston assemblies is filled with hydraulic fluid, the hydraulic fluid is also communicated with the pressure regulating valve so that it takes longer for the hydraulic fluid to fill in the cylinder chamber, which is disadvantageous.

In order to overcome such a disadvantage, the present inventors have proposed a device for gradually increasing hydraulic pressure which shuts off the pressure chamber of a pressure regulating valve from a main hydraulic circuit until the cylinder chamber of a hydraulically operated cylinder-piston assembly is filled with hydraulic fluid, as shown in FIG. 1.

However, this prior device for gradually increasing hydraulic pressure has an orifice $e$ between a passage $b$ and the pressure chamber $d$ of a pressure regulating valve $c$ for preventing a pressure vibration at the means $a$ for gradually increasing hydraulic pressure. Consequently, even if the transmission is shifted so that the cylinder chamber of a hydraulically operated cylinder-piston assembly $f$ is filled with hydraulic fluid with the result that the pressure chamber $d$ of the pressure regulating valve $c$ is communicated with the passage $b$, the hydraulic fluid within the passage $b$ is throttled by the orifice $e$, and the hydraulic fluid is therefore introduced gradually into the pressure chamber $d$ of the pressure regulating valve $c$. As a result, the responsibility of the means $a$ for gradually increasing hydraulic pressure is deteriorated at the time of starting a gradual increase of the hydraulic pressure so that peak pressure is produced in the hydraulic fluid supply control circuit of the transmission having a source of hydraulic pressure of large capacity immediately before the hydraulic pressure is gradually increased in the hydraulic fluid supply control circuit, as shown in FIG. 2 with the result that a shock occurs when the transmission is shifted.

Furthermore, as the peak pressure takes place as described above in the hydraulic fluid supply control circuit of the transmission, the fluid amount introduced through an orifice $h$ of quick return valve $g$ into a chamber $i$ is increased so that cylindrical valve $j$ is moved in a leftward direction relative to the drawing until the hydraulic pressure starts to gradually increase so that the load of a spring $k$ is increased with the result that the hydraulic pressure at the time of starting to gradually increase the hydraulic pressure is disadvantageous.

It is, therefore, an object of the present invention to provide a device for gradually increasing in a hydraulic fluid supply control circuit of a transmission which eliminates the aforementioned disadvantages of conventional devices for gradually increasing hydraulic pressure in the hydraulic circuit of the transmission and which may provide fast shifting of the transmission.

It is another object of the present invention to provide a device for gradually increasing hydraulic pressure in a hydraulic fluid supply control circuit of a transmission which may reduce the shock normally occurring upon the shifting of a transmission.

It is still another object of the present invention to provide a device for gradually increasing hydraulic pressure in a hydraulic fluid supply control circuit of a transmission which may attenuate the hydraulic pressure vibration which normally occurs after the hydraulic pressure begins to be gradually increased in the hydraulic circuit of the transmission.

It is still another object of the present invention to provide a device for gradually increasing hydraulic pressure in a hydraulic fluid supply control circuit of a transmission which may shut off the main hydraulic circuit from a pressure regulating valve until the cylinder chamber of each of hydraulically operated cylinder-piston assemblies of clutches provided in the transmission is filled with hydraulic fluid and may not produce peak pressure immediately before the hydraulic pressure begins to be gradually increased.

SUMMARY OF THE INVENTION

In accordance with the present invention, a device for gradually increasing hydraulic pressure in the hydraulic control circuit of a transmission is contemplated, and it is further contemplated that the devices will be comprised generally of a valve box with inlets and outlets, wherein the box is communicated with a source of hydraulic pressure and also comprising at least one cylinder-piston assembly of a clutch which is communicated with the box by an outlet and including at least two cylindrical holes containing a cylindrical valve in one with a pressure regulating valve therein and a load piston linerally arranged therein and slidably inserted in the other cylindrical hole, a quick return valve with land portions and annular recess portions thereon, wherein a back pressure chamber is located co-extensively with the load piston and one end of the pressure regulating valve and the cylindrical valve is each respectively controlled by a compression coil spring and a pressure regulating spring and also holes or ports to connect the inlet and outlet passages with intermediate passages to convey the hydraulic fluid, all designed for shortening the time for providing and conveying hydraulic fluid to a clutch system of the transmission for decreasing the hydraulic pressure or starting in order to permit the gradual increase of hydraulic pressure in the system.

BRIEF DESCRIPTION OF THE DRAWINGS

These and other objects, features and advantages of the device for gradually increasing hydraulic pressure in a hydraulic fluid supply control circuit of the transmission according to the present invention will become more easily apparent from the following description taken in conjunction with the accompanying drawings, in which.

DETAILED DESCRIPTION OF THE INVENTION

Figure 1:
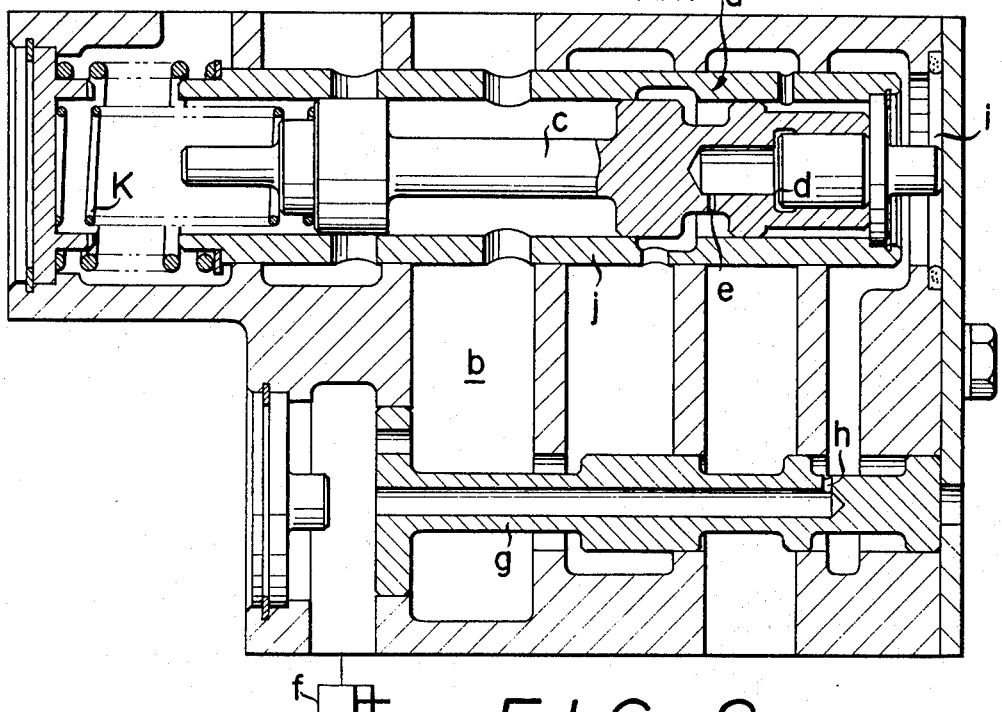
FIG. 1 is a sectional view of a conventional device for gradually increasing hydraulic pressure in the hydraulic circuit of a transmission.
Figure 2:
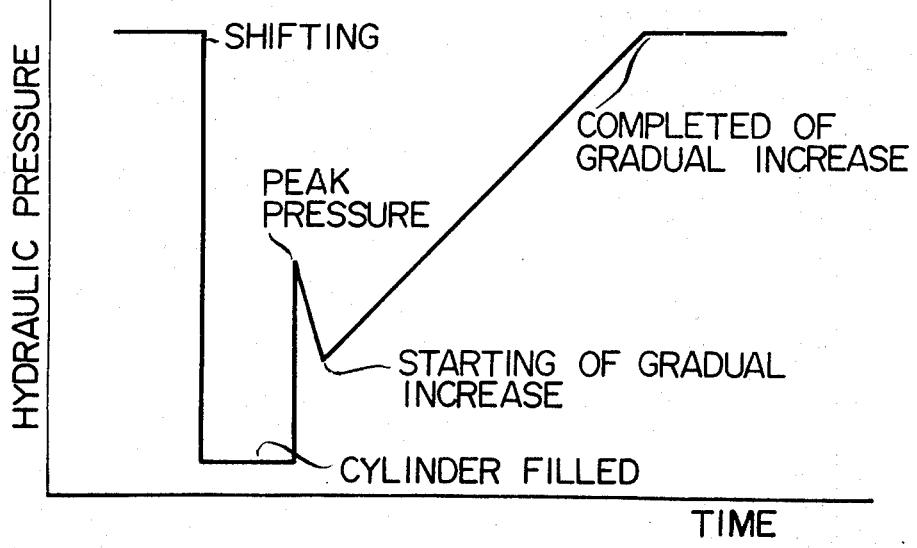
FIG. 2 is a graph of a curve for hydraulic pressure in the hydraulic circuit of the device shown in FIG. 1 in terms of time vs. pressure.
Figure 3:
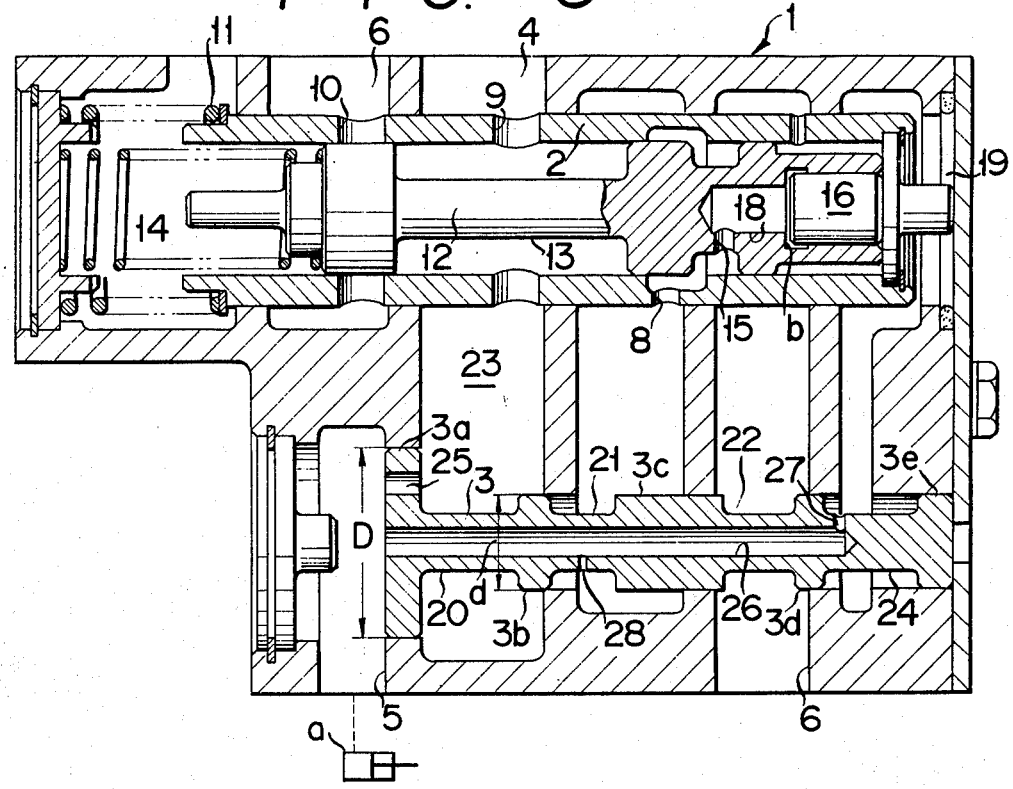
FIG. 3 is a sectional view of a device for gradually increasing the hydraulic pressure in a hydraulic fluid supply control circuit of a transmission according to the present invention.
Figure 4:
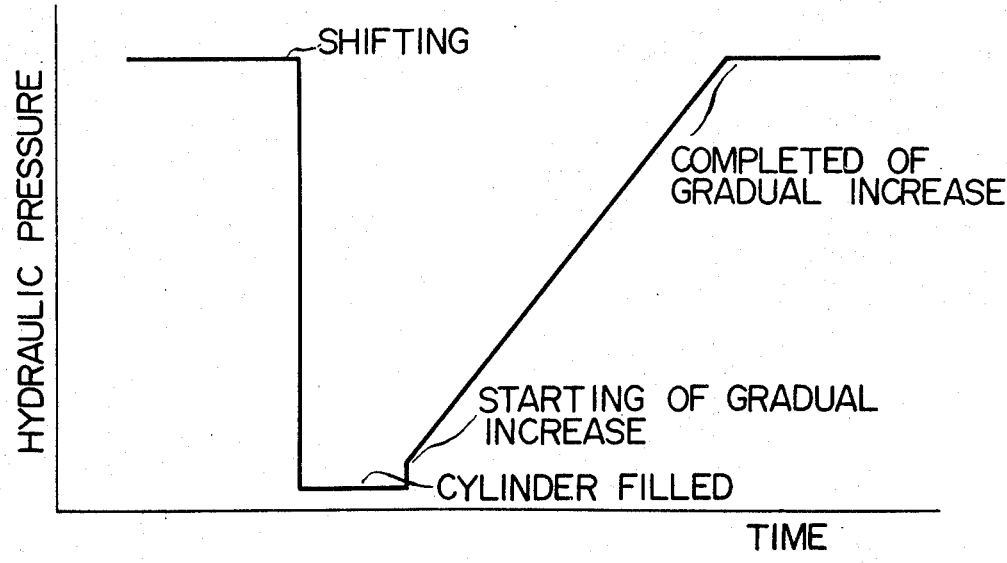
FIG. 4 is a graph of a curve similar to FIG. 2, but showing the hydraulic pressure of the device shown in FIGS. 3 and 5.

Referring now to FIGS. 3 and 4, one embodiment of the device for gradually increasing the hydraulic pressure in a hydraulic fluid supply control circuit of the transmission according to the present invention will be described as follows:

Numeral 1 illustrates a valve box slidably engaging a cylindrical hollow valve 2 and a quick return valve 3, which valve box 1 has an inlet 4 communicated with a source of hydraulic pressure (not shown), an outlet 5 communicated with the inlet 4 and also with a cylinder-piston assembly a, for a clutch provided in the transmission and a drain port 6 communicated with a low pressure circuit (not shown). The cylindrical hollow valve 2 slidably engaged with the valve box 1 has holes or ports 8, 9, and 10 formed thereat and is urged by a compression coil spring 11 disposed at one side of the valve box 1 toward the other side of the end thereof (in a right direction relative to the drawing). Numeral 12 shows a pressure regulating valve of spool type, which valve 12 has an annular recess portion 13 formed there-around and is slidably inserted into the cylindrical hollow valve 2 and is urged by a pressure regulating spring 14 disposed at one side of the valve box 1 toward the other side at the end thereof (in a right direction relative to the drawing). The pressure regulating valve 12 also has a load piston 16 axially slidably inserted thereinto in a pressure chamber b formed therein, which the chamber b is communicated through a hole 18 formed in the pressure regulating valve 12 adjacent to the pressure chamber b and a hole 15 formed in the pressure regulating valve 12 with the port 8 formed in the cylindrical hollow valve 2. Numeral 19 designates a back pressure chamber formed between the back of the head of the cylindrical hollow valve 2 and the quick return valve 3 for urging the cylindrical hollow valve 2 in a leftward direction relative to the drawing by the hydraulic pressure in the back pressure chamber 19.

On the other hand, the quick return valve 3 has annular recess portions 20, 21, 22 and 24, and first another, second, third and fourth land portions 3a, 3b, 3c, 3d and 3e respectively formed thereon and engaged slidably with the respective portions of the valve box 1 in support. The land portion 3a of the quick return valve 3 opens and closes a passage 23 for communicating the inlet 4 with the outlet 5. The land portions 3b and 3c open and close the passage 23 and the port 8 of the cylindrical hollow valve 2 in such a manner that when the passage 23 is opened, the passage 23 is shut off from the port 8 of the cylindrical hollow valve 2 by the land portion 3c; when the passges 23 is shut off, the passage 23 is shut off from the port 8 of the cylindrical hollow valve 2 by the land 3b; the passage 23 is communicated with the port 8 of the cylindrical hollow valve 2 only while the quick return valve 3 is moving so that the passage 23 is transferred from an open state to a closed state; the land portion 3d communicates or shuts off the back pressure chamber 19 with or from the drain port 6 in such a manner that when the passage 23 is opened to 5, the back pressure chamber 19 is communicated with the drain port 6, and when the passage 23 is shut off, the back pressure chamber 19 is shut off from the drain port 6. The diameter D of the land portion 3a is larger than the diameter d of the land portion 3b of the quick return valve 3, and a fine hole 25 is formed at the land portion 3a so sized in diameter as to replenish any amount that has leaked from the outlet 5 when the quick return valve 3 is moved in a rightward direction relative to the drawing so that the passage 23 is shut off by the land portion 3a. A cavity 26 is formed at the axial center of the quick return valve 3 opened at one end to the outlet 5, and is communicated with the back pressure chamber 19 through an orifice 27 formed at the quick return valve 3 and is also communicated with the port 8 of the cylindrical hollow valve 2 through an orifice 28 formed at the quick return valve 3.

In operation of the device thus constructed, the hydraulic fluid fed from the inlet 4 is supplied through the hole 9 formed at the cylindrical hollow valve 2, annular recess portion 13 of the pressure regulator valve 12, and passage 23 to the annular recess portion 20 of the quick return valve 3 so as to act on the end surfaces of the land portions 3a and 3b. Since the diameter D of the land portion 3a is larger than the diameter d of the land portion 3b, the pressure receiving area of the end surface of the land portion 3a is larger than that of the land portion 3b, so that the quick return valve 3 is urged in a leftward direction relating to the drawing with the result that the passage 23 is opened and accordingly the inlet 4 is communicated with outlet 5. Therefore, the hydraulic fluid from the outlet 5 is supplied to the clutch cylinder a so as to fill the clutch cylinder a such that the hydraulic pressure in the passage 23 is somewhat increased. At this time, the port 8 of the cylindrical hollow valve 2 is shut off from the passage 23 by the land portion 3c of the quick return valve 3. When the hydraulic pressure in the passage 5 is somewhat increased, the quick return valve 3 is urged in a rightward direction relative to the drawing by hydraulic pressure acting onto the end surface thereof. Meanwhile, the port 8 of the cylindrical hollow valve 2 is communicated through the annular recess portion 21 with the passage 23 so that hydraulic fluid is supplied through the port 8 of the cylindrical hollow valve 2, hole 15 formed in the pressure regulating valve 12, and hole 18 formed in the pressure regulating valve 12 to the pressure chamber b of the load piston 16 so as to urge valve 12 to leftwardly. When the quick return valve 3 reaches its leftward stroke end, the passage 23 is shut off from the port 8 of the cylindrical hollow valve 2 by the land portion 3b of the quick return valve 3 so that outlet 5 is communicated through the cavity 26 of the quick return valve 3 and the orifice 27 thereof with the back pressure chamber 19 and is also communicated through the cavity 26 of the quick return valve 3 and the orifice 28 with the port 8 of the cylindrical hollow valve 2. The hydraulic fluid from the passage 23 is supplied to supplement the cylinder-piston assembly a through line fine hole 25 formed at the land portion 3a of the quick return valve 3 and the outlet 5. When the hydraulic pressure is further increased from this state or condition, the pressure regulating valve 12 is moved in a leftward direction relative to the drawing by the action of the load piston 16 against the spring 14 so that the recess portion 13 is communicated with hole 10 of cylindrical hollow valve 2 so as to be balanced.

On the other hand, part of the hydraulic fluid in the passage 23 is fed through the cavity 26 and orifice 27 of the quick return valve 3 into the back pressure chamber 19, and when the pressure chamber 19 is filled with hydraulic fluid, the hydraulic pressure in the back pressure chamber 19 is somewhat increased. When the hydraulic pressure in the back pressure chamber 19 is thus increased, the cylindrical hollow valve 2 is moved in a leftward direction relative to the drawing against the tension of the spring 11. Therefore, the hole 10 of the cylindrical hollow valve 2 is moved in a leftward direction relative to the drawing, and the hydraulic fluid in the annular recess portion 13 cannot be blown out through the hole 10 of the cylindrical hollow valve 2 unless the hydraulic pressure becomes higher. Thus, the hydraulic pressure in the passage 23 is increased proportionally to the moving speed of the cylindrical hollow valve 2 so that since the moving speed of the cylindrical hollow valve 2 is restricted by the orifice 27 of the quick return valve 3, the hydraulic pressure is gradually increased at a constant speed automatically. When the cylindrical hollow valve 2 reaches the left end of its travel, the increase in the hydraulic pressure is stopped so that the hydraulic pressure (set pressure) at this time is maintained. When the clutch is being disengaged, the amount of the hydraulic fluid in the passage beyond the outlet 5 is instantaneously decreased so that the hydraulic pressure in the outlet 5 is accordingly lowered.

On the other hand, since the passage 23 is communicated with a source of hydraulic pressure (not shown) so that hydraulic fluid is always fed thereinto, it is filled with the hydraulic fluid, and since the passage 23 is communicated with the outlet 5 only through the fine hole 25 of the land portion 3a of the quick return valve 3 when the quick return valve 3 is disposed at its rightward position in the drawing, the hydraulic pressure difference between the passage 23 and the outlet 5 becomes larger so that the quick return valve 3 is quickly urged in a leftward direction relative to the drawing. At this time, the pressure chamber b of the load position 16 is communicated through the hole 18 and 15 formed in the pressure regulating valve 12, port 8 formed in the cylindrical hollow valve 2, annular recess portion 22 formed in the quick return valve 3 with the drain port 6. When the quick return valve 3 is then urged to its leftward stroke end, the back pressure chamber 19 is communicated through the annular recesss portion 24 of the quick return valve 3 with the drain port 6, and simultaneously the passage 23 is shut off by the land portion 3c of the quick return valve 3 from the port 8 of the cylindrical hollow valve 2.

Therefore, since the hydraulic fluid in the back pressure chamber 19 is thus discharged from the drain port 6, the cylindrical hollow valve 2 is urged in a rightward direction relative to the drawing by the coil springs 11 and 14 disposed at the left side of the cylindrical hollow valve 2 so that the cylindrical hollow valve 2 is returned to the original right position as shown in FIG. 3. Then, from this state, the aforementioned operation is again repeated.

Figure 5:
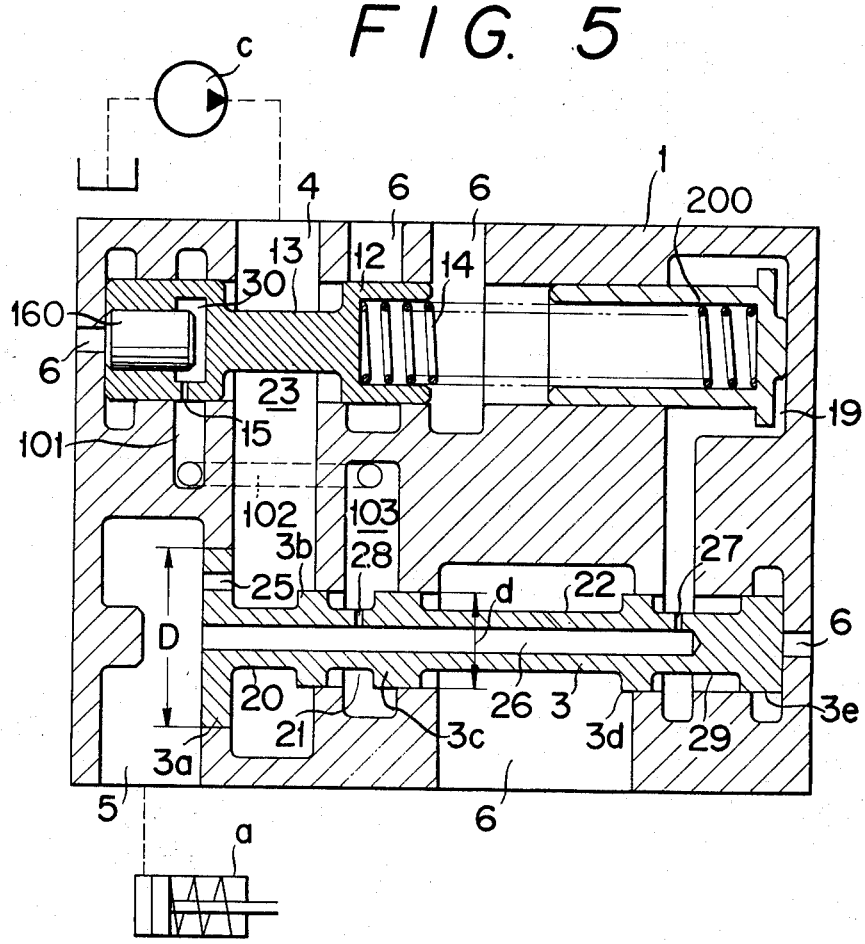
FIG. 5 is a sectional view of another embodiment of the present invention.

Referring now to FIG. 5, which shows a sectional view of another embodiment of the device for gradually increasing the hydraulic pressure in the hydraulic fluid supply control circuit of the transmission of the invention, numeral 1 indicates a valve box slidably engaging a first load piston 200 and a quick return valve 3, which valve box 1 has an inlet 4 communicated with a source of hydraulic pressure C, an outlet 5 communicated with the inlet 4 and also with a cylinder-piston assembly $a$ of a clutch of the transmission, and a drain port 6 communicated with a low pressure circuit (not shown). The first load piston 200, which is slidably engaged with the valve box 1, is urged by a pressure regulating spring 14 disposed therein toward the right side inner wall of the valve box 1 at the valve end thereof. Numeral 12 shows a pressure regulating valve of the spool type, which valve 12 has an annular recess portion 13 and is slidably inserted into the valve box 1 and is urged by the pressure regulating spring 14 toward the other side inner wall of the valve box 1 at the valve end thereof. The pressure regulating valve 12 also has a second load piston 160 axially slidably inserted thereinto in a pressure chamber 30 formed therein, which chamber 30 is communicated through a hole 15 formed at the pressure regulating valve, passage 101 formed at the valve box 1 with passages 102 and 103 formed at the valve box 1. Numeral 19 illustrates a back pressure chamber formed between the back surface of the head of the first load piston 200 and the quick return valve 3 for urging the first load piston 200 in a leftward direction relative to the drawing by the hydraulic pressure in the back pressure chamber 19.

On the other hand, the quick return valve 3 has annular recess portions 20, 21, 22 and 29, and land portions 3a, 3b, 3c, 3d and 3e formed thereon and engaged slidably with the respective portions of the valve box 1 in support. The land portion 3a of the quick return valve 3 opens and closes a passage 23 for communicating the inlet 4 with the outlet 5, the land portions 3b and 3c open and close the passage 23 and the hole 15 of the pressure regulating valve 12 in such a manner that when the passage 23 is opened, the passage 23 is shut off from the hole 15 of the pressure regulating valve 12 by the land portion 3c; when the passage 23 is shut off from the hole 15 of the pressure regulator valve 12 by the land 3b; the passage 23 is communicated with the hole 15 of the pressure regulating valve 12 only while the quick return valve 3 is moving so that the passage 23 is transferred from open state to closed state; the land portion 3d communicates or shuts off the back pressure chamber 19 with or from the drain port 6 in such a manner that when the passage 23 is opened, the back pressure chamber 19 is communicated with the drain port 6, and when the passage 23 is shut off, the back pressure chamber 19 is shut off from the drain port 6. The diameter D of the land portion 3a is larger than the diameter d of the land portion 3b of the quick return valve 3, and a fine hole 25 is formed at the land portion 3a so sized in diameter as to replenish the leaked amount from the outlet 5 when the quick return valve 3 is moved in rightward direction relative to the drawing to that the passage 23 is shut off by the land portion 3a. A cavity 26 is formed at the axial center of the quick return valve 3 opened at one end with the outlet 5, and is communicated through an orifice 27 formed at the quick return valve 3 with the back pressure chamber 19 and is also communicated through an orifice 28 formed at the quick return valve 3 with the hole 15 of the pressure regulating valve 12.

In operation of the device thus constructed, the hydraulic fluid fed from the inlet 4 is supplied through annular recess portion 13 of the pressure regulating valve 12, and passage 23 to the annular recess portion 20 of the quick return valve 3 so as to act on the end surfaces of the land portions 3a and 3b. Since the diameter D of the land portion 3a is larger than the diameter d of the land portion 3b, the pressure receiving area of the end surface of the land portion 3a is larger than that of the land portion 3b so that the quick return valve 3 is urged in a leftward direction relative to the drawing with the result that the pressure 23 is opened and accordingly the inlet 4 is communicated with the outlet 5. Therefore, the hydraulic fluid from the outlet 5 is supplied to the cylinder-piston assembly a so as to fill the cylinder-piston assembly a so that the hydraulic pressure in the passage 23 is somewhat increased. At this time, the hole 15 of the pressure regulating valve 12 is shut off from the passage 23 by the land portion 3c of the quick return valve 3. When the hydraulic pressure in the passage 23 is somewhat increased, the quick return valve 3 is urged in a rightward direction relative to the drawing by the hydraulic pressure acting onto the end surface thereof. Meanwhile, the hole 15 of the pressure regulating valve 12 is communicated through the annular recess portion 21 with the passage 23 so that the hydraulic fluid is supplied through the hole 15 of the pressure regulating valve 12 to the pressure chamber 30 of the load piston 16. When the quick return valve 3 reaches its stroke end, the passage 23 is shut off from the hole 15 of the pressure regulating valve 12 by the land portion 3b of the quick return valve 3, and the passage 23 is shut off from the outlet 5 by the land portion 3a of the quick return valve 3 so that the outlet 5 is communicated through the cavity 26 of the quick return valve 3 and the orifice 27 thereof with the back pressure chamber 19 and is also communicated through the cavity 26 of the quick return valve 3 and the orifice 28 with the hole 15 of the pressure regulating valve 12. The hydraulic fluid from the passage 23 is supplied to supplement the cylinder-piston assembly a through the fine hole 25 formed at the land portion 3a of the quick return valve 3 and the outlet 5. When the hydraulic pressure is further increased from this state, the pressure regulating valve 12 is moved in a rightward direction relative to the drawing by the action of the second load piston 160 against the spring 14 so that the recess portion 13 is communicated with the drain port 6 of the valve box 1 so as to be balanced.

On the other hand, part of the hydraulic fluid in the passage 23 is fed through the cavity 26 and orifice 27 of the quick return valve 3 into the back pressure chamber 19, and the back pressure chamber 19 is thus filled with hydraulic fluid. The hydraulic fluid. The hydraulic pressure in the back pressure chamber 19 is increased so that it becomes equal to that in the outlet 5. When the hydraulic pressure in the back pressure chamber 19 is thus increased, the second load piston 200 is moved in a leftward direction relative to the drawing against the tension of the spring 14. Therefore, the pressure regulating valve 12 is moved in a leftward direction relative to the drawing, and the hydraulic fluid in the annular recess portion 13 cannot be blown out through the drain port 6 unless the hydraulic pressure becomes higher. Thus, the hydraulic pressure in the passage 23 is increased proportionally to the moving speed of the first load piston 200 so that since the moving speed of the first load piston 200 is restricted by the orifice 27 of the quick return valve 3, the hydraulic pressure is gradually increased at a constant speed automatically. When the second load piston 200 reaches the left end thereof in the drawing, the increase of hydraulic pressure is stopped so that the hydraulic pressure (set pressure) at this time is maintained. When the clutch is disengaged in this state, the amount of hydraulic fluid in the passage beyond the outlet 5 is instantaneously decreased so that the hydraulic pressure in the outlet 5 is accordingly lowered.

On the other hand, since the passage 23 is communicated with the source of hydraulic pressure C so that the hydraulic fluid is always fed thereinto, it is filled with the hydraulic fluid, and since the passage 23 is communicated with the outlet 5 only through the fine holes 25 of the land portion 3a of the quick return valve 3 when the quick return valve 3 is disposed at its extreme right position in the drawing, the hydraulic pressure difference between the passage 23 and the outlet 5 becomes larger so that the quick return valve 3 is quickly urged to the left in the drawing. At this time, the pressure chamber 30 of the second load piston 160 is communicated through the hole 102 formed at the valve box 1, and annular recess portion 22 formed in the quick return valve 3 with the drain port 6. When the quick return valve 3 is then urged to its leftward stroke end, the back pressure chamber 19 is communicated through the annular recess portion 29 of the quick return valve 3 with the drain port 6, and simultaneously the passage 23 is shut off by the land portion 3c of the quick return valve 3 from the hole 15 of the pressure regulating valve 12.

Therefore, since the hydraulic fluid in the back pressure chamber 19 is thus discharged from the drain port 6, the first load piston 200 is urged to the right in the drawing by the coil spring 14 disposed between the first load piston 200 and the pressure regulating valve 12 so that the first load piston 200 is returned to the original right position as shown in FIG. 5. Then, from this state, the aforementioned operation is again repeated.

It should be understood from the foregoing description that since the device of the present invention is thus constructed, the passage 23 is shut off from the pressure chamber 30 of the pressure regulating valve 12 while the hydraulic fluid in the passage 23 fills the cylinder chamber of the hydraulically operated cylinder-piston assembly a so that even if the fluid exists in the passage 23, the total discharge amount from the source of hydraulic pressure is supplied to the cylinder chamber with the result that the time that the hydraulic fluid fills the cylinder chamber becomes short so as to quickly shift the transmission.

It should also be understood that since the passage 23 is directly communicated with the pressure chamber 30 of the pressure regulating valve 12 while the hyraulic fluid is filled in the cylinder chamber of the hydraulically operated cylinder-piston assembly a so that the quick return valve 3 is moving from the position where the passage 23 is shut off from the cylinder chamber to the position immediately before the right stroke end of the drawing, when the transmission is shifted so that the hydraulic fluid fills the cylinder chamber of the hydraulically operated cylinder-piston assembly a with the result that the quick return valve 3 starts to operate, the hydraulic pressure is quickly supplied to the pressure chamber 30 of the pressure regulating valve 12 so as to shorten the responding time of the pressure regulating valve 12, and accordingly peak pressure is not generated immediately before the hydraulic pressure starts to gradually increase, and yet the hydraulic fluid fed into the back pressure chamber 19 can be reduced through the orifice 27 formed in the quick return valve 3 within the above responding time so that the hydraulic pressure which starts to gradually increase becomes lower with the result that the quick return valve has completed its move to the position where the passage 23 is shut off from the pressure chamber 30 of the pressure regulating valve 12 so that when the hydraulic pressure starts to gradually increase, the hydraulic fluid in the passage 23 is supplied to the pressure chamber 30 of the pressure regulating valve 12 through the fine hole 28 formed in the quick return valve 3. Therefore, the hydraulic pressure vibration immediately after the hydraulic pressure is gradually increased is attenuated.

It should also be understood that since the device of the present invention is thus constructed, when the device is used in the transmission having a large capacity source of hydraulic pressure, the transmission can be quickly shifted, and since the peak pressure is not generated immediately before the hydraulic pressure starts to gradually increase and the hydraulic pressure which starts to gradually increase is low, the shock of the transmission upon shifting may be reduced so as to provide less hydraulic pressure vibration for a gradual increase of hydraulic pressure.

The present invention may be embodied in other specific forms without departing from the spirit and essential characteristics thereof. The presently disclosed embodiments therefore are to be considered in all respects as illustrative and not restrictive, the scope of the invention being indicated by the printed claims rather than by the aforegoing description, and all changes which come within the meaning and range of equivalency of the claims are therefore intended to be embraced therein.

What is claimed is:

1. A device for gradually increasing hydraulic pressure in a hydraulic fluid supply control circuit of a transmission in which a plurality of clutch means, each having a hyraulically operated cylinder-piston assembly, and a source of hydraulic pressure, said device including an inlet connected to said source of hydraulic pressure; an outlet connected to said cylinder-piston assembly; a first passage formed therethrough for permitting said inlet and outlet to communicate with each other; means for gradually increasing hydraulic pressure having a pressure chamber and slidably provided within a box of the device by the side of said inlet while intersecting said first passage; a second passage formed therewithin for permitting said first passage and the pressure chamber of said means to communicate with each other; a back pressure chamber formed therewithin at the back of said means; a third passage formed therewithin for permitting said second passage, said back pressure chamber and a drain to communicate with one another; and a quick return valve slidably provided with the device by the side of said outlet while intersecting said first, second and third passages for controlling said means so that hydraulic fluid in said first passage is supplied through said second passage to said pressure chamber of said means to control the gradual increase of hydraulic pressure in said first passage, said quick return valve having first, second, third and fourth annular land portions formed, in turn, on its outer periphery along its longitudinal axis; first, second and third annular recess portions formed between the respective land portions; and a cavity formed therein along its longitudinal axis, one end of said cavity being opened to said first passage and the other opposite end thereof being formed with an orifice so as to permit said cavity and said back pressure chamber to communicate therethrough with each other, the improvement characterized in that said quick return valve comprises:

a. another annular land portion formed between said first and second annular land portions so that, when said quick return valve is located at a first position for shutting off said first passage through said first annular land portion and at a second position for opening said first passage, said quick return valve shuts off said second passage through said another annular land portion and said second annular land portion, respectively, and while said quick return valve is slidingly moving from said first position to said second position, said second passage is opened, b. another orifice formed between said first passage and said second passage so as to permit said first passage and said second passage to communicate with each other when said quick return valve is located at said first position, and c. a hole formed in said means for permitting said second passage and said pressure chamber of said means to immediately communicate with each other, whereby the responsibility of said means to gradually increase hydraulic pressure in said first passage is improved at the time when the gradual increasae of hydraulic pressure is started without producing peak pressure immediately before the start of the gradual increase of hydraulic pressure, thereby providing fast shifting of said transmission.

2. A device as set forth in claim 1, wherein said quick return valve comprises a large diameter land portion and at leaast one small diameter land portion.

3. A device as set forth in claim 2, wherein said means for gradually increasing hydraulic pressure comprises a pressure regulator valve and a first load piston.

4. A device as set forth in claim 3, wherein said quick return valve comprises a cavity formed along the axis thereof and opened at one end, and first and second orifices formed therethrough.

5. A device as set forth in claim 4, wherein said passage is communicated with the pressure chamber of the pressure regulator valve of said means through said first orifice formed in said quick return valve.

6. A device as set forth in claim 4, wherein when said passage is opened, the back pressure chamber of the pressure regulator valve of said means is shut off from said passage and is communicated with a drain port, and when said passage is shut off, said back pressure chamber is communicated with said passage through said second orifice and is shut off from said drain port.

7. A device as set forth in claim 2, wherein said means for gradually increasing hyraulic pressure comprises a cylindrical valve and a pressure regulator valve slidably inserted into said cylindrical valve.

8. A device as set forth in claim 7, wherein said quick return valve is provided with a cavity formed along the axis thereof and opened at one end, and first and second orifices formed therethrough.

9. A device as set forth in claim 8, wherein said passage is communicated with the pressure chamber of the pressure regulator valve of said means through said first orifice formed in said quick return valve.

10. A device as set forth in claim 8, wherein when said passage is opened, the back pressure chamber of the cylindrical valve of said means is shut off from said passage and is communicated wtih a drain port, and when said passage is shut off, said back pressure chamber is communicated with said passage through said second orifice and is shut off from said drain port.

11. A device as set forth in claim 2, wherein a fine hole is provided in said large diameter land portion of said quick return valve for communicating said passage with the outlet.

12. A device as set forth in claim 7, wherein the pressure regulator valve of said means comprises a load piston slidably inserted axially thereinto and a spring coil disposed at one end thereof for urging said pressure regulator valve toward said cylindrical valve.

13. A device as set forth in claim 1, wherein said means for gradually increasing hydraulic pressure comprises a cylindrical hollow valve section slidably disposed within the box of said device while linearly extending over the inside of the box in the direction substantially perpendicular to said first passage, a pressure regulator valve section slidably inserted in said cylindrical hollow valve section, a load piston slidably inserted into one end of said pressure regulator valve section so that said pressure chamber is defined between said pressure regulator valve section and said load piston, a first compression spring disposed between one end plate of said box and one end of said cylindrical hollow valve section so as to urge said cylindrical hollow valve section against the other end plate of said box upon normal condition, and a second compressionn spring provided between said one end plate of said box and the other end of said pressure regulator valve section opposite to said one end thereof where said load piston is inserted so as to urge said pressure regulator valve section against said load piston.

14. A device as set forth in claim 1, wherein said means for gradually increasing hyraulic pressure comprises a pressure regulator valve section slidably disposed within the box of said device while linearly extending from one inner end of the box to a substantially intermediate portion of the box in the direction substantially perpendicular to said first passage, a first load piston slidably provided in the box and located coaxially with said pressure regulator valve section at the side of the other inner end of the box while leaving a space between said pressure regulator valve and said first load piston, a second load piston slidably inserted into one end of said pressure regulator valve section opposite to the other end thereof facing said first load piston so that said pressure chamber is defined between said pressure regulator valve section and said second load piston, and a compression spring provided between said pressure regulator valve and said first load piston.

* * * * *